United States Patent

[11] 3,601,418

[72] Inventor Thomas O. Kosatka
 Cicero, Ill.
[21] Appl. No. 861,738
[22] Filed Sept. 29, 1969
[45] Patented Aug. 24, 1971
[73] Assignee Dana Corporation
 Toledo, Ohio

[54] ROTARY SHAFT SEAL
 4 Claims, 4 Drawing Figs.
[52] U.S. Cl. .................................................. 277/183
[51] Int. Cl. ..................................................... F16j 15/00
[50] Field of Search............................................ 277/181,
 182, 183, 184, 50, 152, 237 A

[56] References Cited
 UNITED STATES PATENTS
2,264,970 12/1941 Giles ............................ 277/47
2,482,029 9/1949 Reynolds..................... 277/152
2,868,566 1/1959 Kosatka........................ 277/182
3,250,541 5/1966 McKinven, Jr. ............... 277/50 X
3,368,821 2/1968 Papenguth.................... 277/130

Primary Examiner—Samuel B. Rothberg
Attorneys—Walter E. Pavlick, Harold D. Shall, Richardson B. Farley and John F. Teigland ABSTRACT: A rotary shaft seal is disclosed comprised of an outer, rigid case member and an annular elastomeric sealing member which is bonded thereto. The sealing member is comprised of a longitudinally extending flexible collar portion, which is bonded at one end to the case member, and a radial flange which extends radially inwardly from the collar portion and has located at its outer end a molded sealing lip which, in the free state, extends axially of the radial flange. The molded sealing lip is substantially square in cross section. When the seal is mounted on a shaft, the radial flange bends and becomes arcuate, thereby placing a lateral surface of the sealing lip in continuous contact with the shaft.

PATENTED AUG 24 1971 3,601,418

INVENTOR.
THOMAS O. KOSATKA
BY Richardson B Farley
ATTORNEY

ROTARY SHAFT SEAL

This invention relates to a rotary shaft seal for sealing between a stationary member and a relatively rotating shaft.

Conventional rotary shaft seals are comprised of a rigid outer case member and a molded sealing member which is bonded thereto and which is molded from synthetic rubber or a similar resilient material. When viewed in cross section, the conventional seal consists of a longitudinally extending, cantilever beam having at its outer free end two conical surfaces which merge to form a sealing lip which rides in contact with the shaft. Radial loading is achieved by means of a garter spring mounted on the beam opposite the sealing lip. Radial loading is necessary to maintain the sealing lip in continuous contact with the shaft and to counteract the forces created by shaft eccentricity and nonconcentricity between the ceiling lip and the shaft, the latter often being the result of nonconcentricity between the shaft and mounting means of the stationary member, such as the bore of a housing.

The amount of radial loading is critical because synthetic rubber and similar materials are subject to hardening, which is a function of time, pressure and temperature. Heat with an accompanying temperature rise is created by the sealing lip riding in contact with the shaft revolving at high speeds. For this reason, conventional practice calls for the sealing lip to be a knife edge, and as sharp as possible, to reduce the total amount of surface area in contact with the shaft. Obtaining a knife edge is a critical procedure.

Unfortunately, because of the conical merging surfaces, it is virtually impossible to mold a sharp sealing lip without flash in the conventional two-piece mold. Consequently the sealing lip must be trimmed with a knife. Because of the converging surfaces, this is a critical operation and any deviation will cause out-of-roundness and nonuniformity in cross section. Further, a nick in the trimming knife will cause a tear in the sealing lip, resulting in leakage under both static and dynamic conditions.

The rotary shaft seal of this invention deviates from conventional practice in several material respects, and results in an improved rotary shaft seal that can be produced less expensively than conventional seals.

An object of this invention is to provide an improved rotary shaft seal wherein controlled radial loading is achieved without external spring means.

Another object of this invention is to provide a rotary shaft seal of the radial lip type, wherein the lip can be molded without subsequent critical trimming.

A further object of this invention is to provide an improved rotary shaft seal that has extended life and which is comparatively inexpensive to produce.

Rotary shaft seals are used in many applications to provide a seal between a stationary member, such as a housing, and a relatively rotating shaft extending through the housing, for the purpose of retaining lubricant within the housing. The seal between the stationary member and the rotary shaft is generally accomplished by a press-fit with the housing and with or without a sealant at the interface. The seal between the rotary shaft seal and the shaft is accomplished by means of a continuous lip in continuous contact with the shaft, and riding on a dynamically stable thin film of oil.

Figure 1:
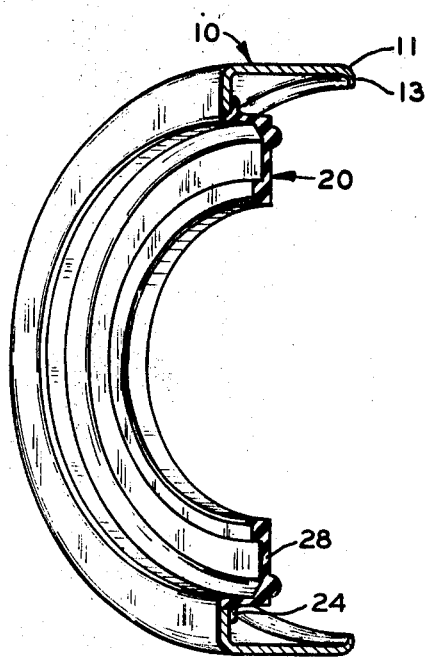
FIG. 1 is a partial perspective view of the rotary shaft seal of this invention.

The rotary shaft seal of this invention is comprised of two primary elements, a rigid outer case member generally referred to by the numeral 10 and a molded sealing element generally referred to by the numeral 20, which is attached to the case member 10.

In the described embodiment, the outer case member 10 is annular and rigid, being preferably formed of steel. At one end 11, it is curled radially inwardly thereby providing a small radially extending flange 13 with the curl, facilitating assembly into the bore of a housing. At its other end it is formed with a larger radially inwardly extending flange 12 and intermediate these two flanges and integral with them is an axially extending portion 15.

The sealing element 20 is molded of conventional materials used in oil seals. The preferred materials include the nitrile rubbers, the butadienes and the acrylo nitriles. The sealing element 20 is bonded to the case 10 during the molding operation, by conventional means. The method of attachment of the sealing member to the case member is not critical, so long as the method of attachment provides a continuous seal between the two elements, and so long as the method of attachment provides sufficient physical strength to retain these two elements in an assemblage during their actual use as a sealing means.

Figure 3:
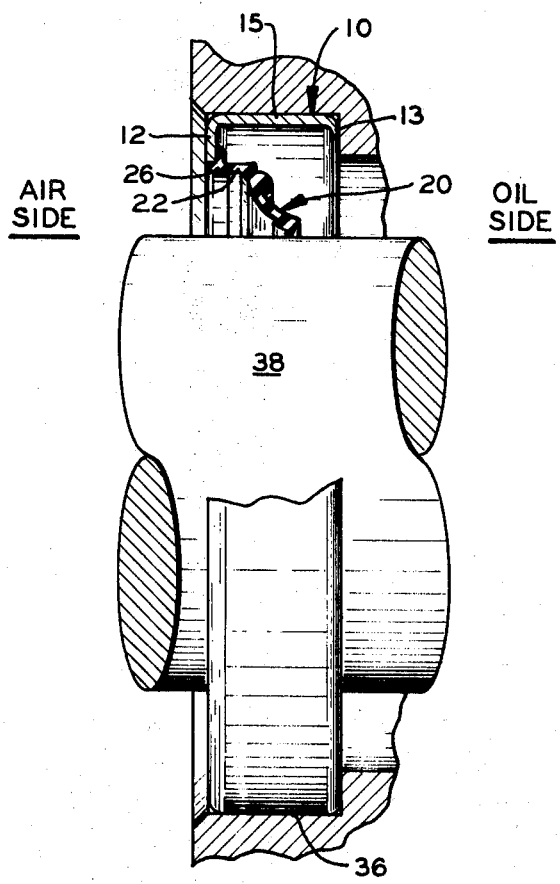
FIG. 3 is a cross-sectional view of the seal of this invention in position in the bore of a housing and mounted on a rotary shaft.

The sealing element 20 comprises an annular or collar portion 22 that helps provide for eccentricity of the shaft on which the sealing element 20 is mounted and that extends axially relative to the major extent of the sealing element 20 and has attached just short of its outer end an outward, radially extending flange 24. One face of the radially extending flange 24 and a face on an outer end 26 of the annular collar portion 22 are bonded to the outer case member 10 so that the sealing element 20 and outer case member 10 act as an integral unit. At the inner end of the sealing element 20 there is formed a radial flange or beam portion 28 that is integral with the collar portion 22 and extends radially inwardly towards the axis of the molded sealing element 20. The inwardly extending flange 28 is disposed at right angles to the annular collar portion 22 so as to form an element which is substantially parallel to radial flange 24. The radial flange 28 includes an enlarged portion 30 at, substantially, its radially inner end, this portion being generally square in cross section to provide an increased cross-sectional area to strengthen the columnar effect of flange 28 so that undesirable flutter occasioned by bouncing is not imparted to molded sealing element 20 as the shaft rotates within it. At the termination of the radial inner end of the molded sealing element 20, the inwardly extending flange 28 is provided with a sealing lip 32. This lip also is substantially square in cross section and is molded integrally the enlarged portion 30 of the inwardly extending flange 28. As can be seen in FIG. 3, because there are no reversed draft angles in the molded sealing element 20, the parting line of its mold need not be placed at the sealing lip 32 location and may preferably be placed at an opposite corner 35 of the enlarged portion 30. This provides a knife edge corner 33 at one of the corners of the sealing lip 32.

The enlarged portion 30 that is formed near the radially inner end of the inwardly extending flange 28 is in the nature of a hoop and, when extended, stretches over a rotating shaft to provide radial loading for the lip 32. This enlarged portion may be sized to provide the desired radial loading when considered, of course, with the size and thickness of the remaining elements of the sealing element 20.

Intermediate the length of the inwardly extending flange 28 is a bulbous portion 34 which shortens the columnar effect of the inwardly extending flange 28 and insures that any deformation in bending of the molded sealing element 20 will occur either above or below of the bulbous portion 34.

Referring to FIG. 3 the outer case member 10 and molded sealing element 20 can be seen as disposed in sealing engagement between a bore 36 and a shaft 38. The outer case member 10 is designed to form a press fit with the said bore 36 of a conveniently mounted housing 40 which also pilotingly mounts the shaft 38 for rotation therein. Thus, the bore 36 is stationary relative to the outer case member 10 and the molded sealing element 20 and, if desired, a sealant may be interposed at the inner face between the outer case member 10 and the housing 40 to insure proper sealing.

Figure 2:
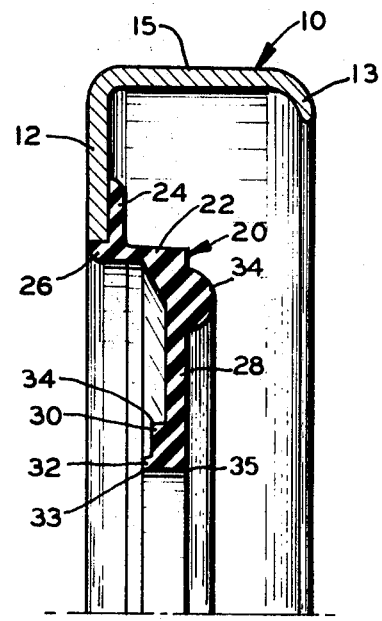
FIG. 2 is a cross-sectional view, taken through the centerline of the seal of this invention, showing the upper half of the seal in its free state.

As can be seen from a comparison of FIGS. 2 and 3, the diameter of the shaft 38 is substantially larger than the inner diameter of the sealing element 20 in its free undeformed state. Accordingly, when the sealing element 20 is placed on the shaft 38, its inner portion is deformed and curved in an axial direction. The enlarged portion 30 is stretched to provide radial loading and inwardly extending flange 28 disposed below the enlarged bulbous portion 34 assumes an arcuate shape. The sealing lip 32 is displaced and in effect rotated so as to place its formerly radially extending surface in angular relationship with the periphery of the shaft 38. This disposition normally provides an angle between the sealing lip 32 and the shaft 38 which places the flange 28 so as to slant away from the axial inner side of the sealing element 20. At this time the corner 33 makes contact with the shaft 38 to provide an effective seal with a portion of the face of the sealing lip also in engagement with the shaft 38. After a certain amount of wear occurs to the sealing lip 32 it will essentially wear into the point where the entire face of it is in engagement with the shaft 38. However, the contact originally provided by the sealing element 20 and the full face contact finally afforded provides a seal with a minimal contact surface with the shaft 38 thereby preventing heat buildup and providing a sealing element of long life.

In operation, enlarged portion 30 and sealing lip 32 form substantially a collar around the shaft 38, with the radial loading arrived at by the proper sizing of the enlarged portion 30 and taking in consideration the nature of the material being utilized to form the molded sealing element 20. The inwardly extending flange 28 below the enlarged portion 34, because of its arcuate shape, and the annular collar portion 22 which extends axially are free to move in a radial direction thus permitting the sealing lip 32 to float with the shaft 38 allowing for nonconcentricity, shaft eccentricity and whip (i.e., radial movement of the shaft during rotation.)

Figure 4:
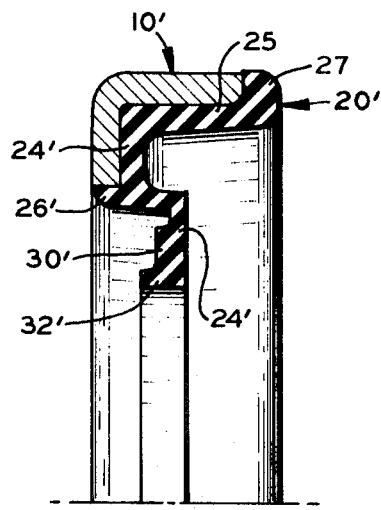
FIG. 4 is a view similar to FIG. 2 but showing a second embodiment of the invention.

A second embodiment of the invention is shown in FIG. 4 wherein the combined outer case member 10' and molded sealing element 20' are to be utilized for sealing between a bore and shaft of substantially smaller dimensions than the bore 36 and shaft 38 of the first embodiment. Thus an enlarged bulbous portion 34 is not needed to insure that the proper columnar effect is provided to prevent flutter of the sealing lip 32'. In this embodiment the radial flange or beam portion 24' is extended in right angle relationship so that it provides an axially extending portion 25 and inturned portion 27 at the outer termination of the axially extending portion 25 so that the outer case member 10' is bonded to the sealing element 20' by an inner face of sealing element 20' formed by an outer end 26, radial flange 24', right angled portion 25 and inturned end 27. Enlarged portion 30' is still provided to yield the aforementioned hoop type effect so as to provide sufficient radial force for the sealing lip 32' to seal against shaft 38.

The combined outer case member 10' and molded sealing element 20' are disposed upon a shaft such as shaft 38 within a bore such as bore 36 in a manner similar to the combined outer case member 10 and molded sealing element 20 with the diameter of the seal being again smaller than the diameter of the shaft so that the sealing lip 32' is disposed in a manner similar to the sealing lip 32 of the first embodiment and the radial flange 24' disposed in an arcuate manner similar to that portion of the radial flange 24 of the first embodiment below the bulbous portion 34.

It should be clear from the aforegoing that a novel seal has been described which fulfills the objects of the invention and has all the attendant advantages thereof. However, it is to be understood that the specific constructions described are only exemplary and that many obvious alternatives for fulfilling the same functions as the instant invention will obviously occur to one skilled in the art without the exercise of inventive skill.

What I claim is:

1. A rotary shaft seal for sealing between a housing and a relatively rotatable shaft extending through said housing, said seal comprising an annular rigid case adapted to sealingly engage said housing, said case including a radially inwardly extending flange, and an elastomeric annulus, said annulus having an axially extending collar portion, one axial end of said collar being peripherally bonded to said radial flange, a radially inwardly extending beam portion integral with the other axial end of said collar and extending radially inwardly therefrom, the radially inner end of said beam portion being enlarged, and a sealing lip integral with the enlarged inner end of said beam portion and extending axially therefrom, said sealing lip being substantially square in cross section and having a shaft engaging sealing surface disposed normal to the axis of said annulus in the free state, the diameter of said sealing lip being sufficiently smaller than the diameter of said shaft whereby on insertion of said shaft said beam portion and said sealing lip are deformed elastically to place said shaft engaging sealing surface in substantially continuous sealing engagement with said shaft.

2. The rotary shaft seal of claim 1, wherein said beam portion is enlarged at its radially outer end to resist bending.

3. A rotary shaft seal for sealing between a housing and a relatively rotating shaft comprising a cylindrical collar of elastomeric material surrounding and spaced radially outwardly from said shaft, means for sealingly securing one axial end of said collar to said housing in substantially concentric relationship to said shaft, an annular flange integral with the other axial end of said cylindrical collar and extending radially inwardly therefrom, the inner peripheral portion of said flange being enlarged, and a substantially square sealing lip integral with the enlarged inner peripheral portion of said flange and extending axially therefrom, said sealing lip having in the free state a shaft engaging sealing surface disposed normal to the axis of said cylindrical collar, the diameter of said inner peripheral portion of said flange and said sealing lip being sufficiently smaller than the diameter of said shaft whereby on insertion of said shaft said flange will become arcuate and said sealing lip rotated to place said shaft engaging sealing surface in substantially continuous sealing engagement with said shaft.

4. The rotary shaft seal of claim 2, wherein said flange is enlarged at its outer radial end to resist bending.